United States Patent
Shiga et al.

(10) Patent No.: US 9,987,522 B2
(45) Date of Patent: Jun. 5, 2018

(54) GOLF BALL RESIN COMPOSITION AND GOLF BALL

(71) Applicant: Dunlop Sports Co. Ltd., Kobe-shi, Hyogo (JP)

(72) Inventors: Kazuyoshi Shiga, Kobe (JP); Hiroshi Tadaoka, Kobe (JP); Masanori Taguchi, Kobe (JP); Takahiro Shigemitsu, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days. days.

(21) Appl. No.: 14/981,442

(22) Filed: Dec. 28, 2015

(65) Prior Publication Data

US 2016/0184641 A1 Jun. 30, 2016

(30) Foreign Application Priority Data

Dec. 26, 2014 (JP) ................................. 2014-266653

(51) Int. Cl.
C08K 5/09 (2006.01)
A63B 37/00 (2006.01)
C08K 3/22 (2006.01)

(52) U.S. Cl.
CPC ...... *A63B 37/0003* (2013.01); *A63B 37/0038* (2013.01); *C08K 3/22* (2013.01); *C08K 5/09* (2013.01); *C08K 2003/2224* (2013.01)

(58) Field of Classification Search
CPC ................... C08K 5/09; C08K 5/098
See application file for complete search history.

(56) References Cited

U.S. PATENT DOCUMENTS

| | | |
|---|---|---|
| 2002/0013421 A1 | 1/2002 | Takesue et al. |
| 2002/0099120 A1 | 7/2002 | Takesue et al. |
| 2003/0050373 A1 | 3/2003 | Chen |
| 2004/0106736 A1 | 6/2004 | Takesue et al. |
| 2009/0118040 A1* | 5/2009 | De Garavilla ........... C08K 5/09 473/373 |
| 2013/0079178 A1 | 3/2013 | Shiga et al. |
| 2014/0274469 A1* | 9/2014 | Kennedy, III ....... A63B 37/007 473/372 |

FOREIGN PATENT DOCUMENTS

| | | |
|---|---|---|
| JP | 2001-348467 A | 12/2001 |
| JP | 2002-219195 A | 8/2002 |
| JP | 2004-180725 A | 7/2004 |
| JP | 2004-524418 A | 8/2004 |
| JP | 2013-78563 A | 5/2013 |

* cited by examiner

*Primary Examiner* — David J Buttner

(74) *Attorney, Agent, or Firm* — Birch, Stewart, Kolasch & Birch, LLP

(57) ABSTRACT

An object of the present invention is to provide a golf ball resin composition excellent in resilience. Another object of the present invention is to provide a golf ball excellent in rebound resilience and shot feeling. The present invention provides a golf ball resin composition comprising: (A) at least one resin component selected from the group consisting of (a-1) a binary copolymer, (a-2) a binary ionomer resin, (a-3) a ternary copolymer, and (a-4) a ternary ionomer resin, (B) a saturated fatty acid, and (C) an unsaturated fatty acid, wherein a total content of (B) the saturated fatty acid and (C) the unsaturated fatty acid ranges from 100 parts by mass to 200 parts by mass with respect to 100 parts by mass of (A) the resin component.

18 Claims, 1 Drawing Sheet

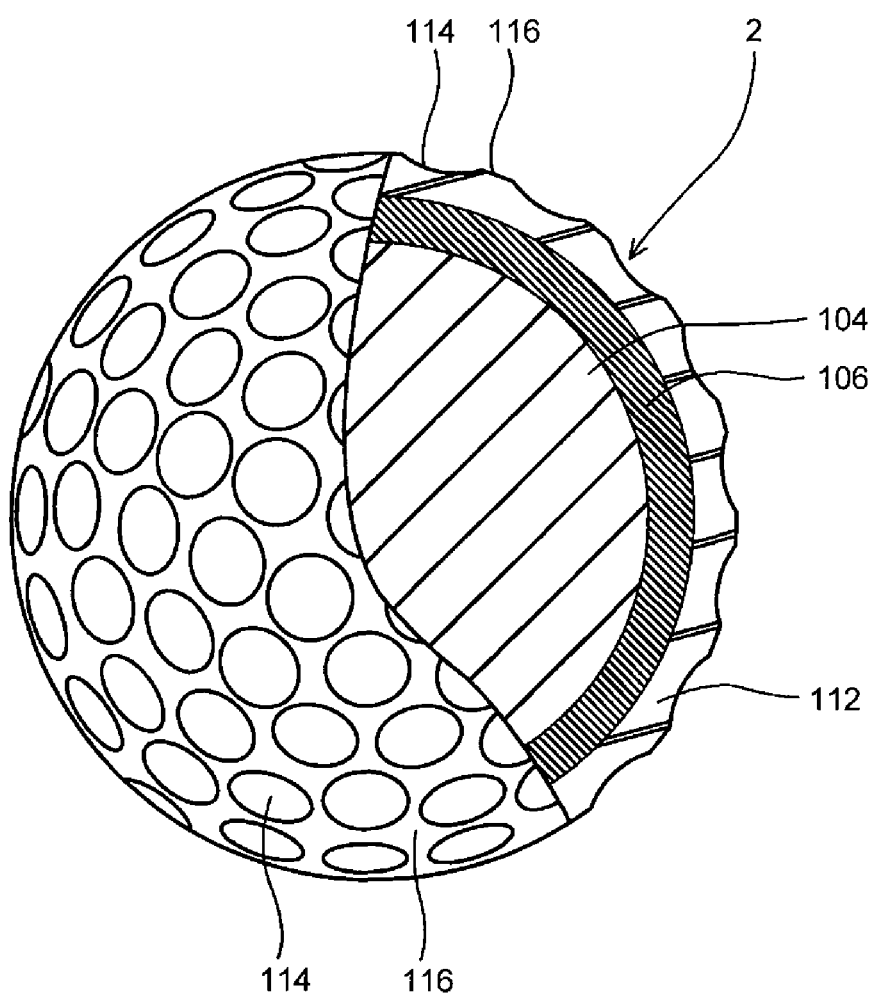

GOLF BALL RESIN COMPOSITION AND GOLF BALL

FIELD OF THE INVENTION

The present invention relates to an improvement in a golf ball resin composition comprising an ionomer resin.

DESCRIPTION OF THE RELATED ART

Examples of a golf ball construction include a two-piece golf ball comprising a core and a cover; a three-piece golf ball comprising a core, a single-layered intermediate layer covering the core, and a cover covering the intermediate layer; and a multi-piece golf ball comprising a core, at least two intermediate layers covering the core, and a cover covering the intermediate layers. An ionomer resin is used as a material constituting each layer of the golf ball. The use of the ionomer resin having high stiffness for the golf ball constituent member provides a golf ball traveling a great distance. Accordingly, the ionomer resin is widely used as a material constituting the intermediate layer or the cover of the golf ball. However, the stiffness and the fluidity of the ionomer resin need to be further improved, and so various technologies for improving these properties have been proposed.

For example, Japanese Patent Publication No. 2004-524418 A discloses a melt processible composition consisting essentially of: (a) a thermoplastic composition comprising an E/X/Y copolymer (where E is ethylene, X is a $C_3$ to $C_8$ α,β ethylenically unsaturated carboxylic acid, and Y is a softening comonomer selected from alkyl acrylate and alkyl methacrylate wherein the alkyl group has 1 to 8 carbon atoms.), and (b) at least one mono-functional aliphatic organic acid having fewer than 36 carbon atoms or salts thereof, wherein a. the E/X/Y copolymer has a melt index of at least 75 grams per ten minutes measured in accord with ASTM D-1238, condition E, at 190° C. using a 2160 gram weight, b. X is about 2 to 30 wt % of the E/X/Y copolymer, and Y is about 17 to 40 wt % of the E/X/Y copolymer, and c. at least 55% of X is neutralized by one or more cation of a alkali metal, a transition metal or an alkaline earth metal; an amount of (b) is about 5 to 50 wt % with respect to a total amount of (a) and (b); and greater than 80% of all the acids of (a) and (b) is neutralized by one or more cation of a alkali metal, a transition metal or an alkaline earth metal.

Japanese Patent Publication No. 2002-219195 A discloses a golf ball material, wherein the golf ball material is a mixture obtained by blending, as essential components, 100 parts by mass of a resin component obtained by blending a base resin and (e) a non-ionomer thermoplastic elastomer in a mass ratio of 100:0 to 50:50, (c) 5 to 80 parts by mass of a fatty acid having a molecular weight of 280 to 1500 and/or a derivative thereof, and (d) 0.1 to 10 parts by mass of a basic inorganic metal compound capable of neutralizing acidic groups left unneutralized in the base resin and the component (c); and wherein the base resin is obtained by blending (a) an olefin-unsaturated carboxylic acid binary random copolymer and/or a metal ion-neutralized product of an olefin-unsaturated carboxylic acid binary random copolymer, and (b) an olefin-unsaturated carboxylic acid-unsaturated carboxylic acid ester ternary random copolymer and/or a metal ion-neutralized product of an olefin-unsaturated carboxylic acid-unsaturated carboxylic acid ester ternary random copolymer, in a mass ratio of 100:0 to 25:75.

Japanese Patent Publication No. 2004-180725 A discloses a golf ball comprising a core and two or more cover layers covering the core, a first cover layer and a second cover layer being adjacent to each other, wherein the first cover layer is mainly formed from (a) a non-ionomer thermoplastic elastomer and (b) a mixture of (b-1) an isocyanate compound and (b-2) a thermoplastic resin substantially unreactive with isocyanate; and the second cover layer is mainly formed from a mixture composed of: a resin component obtained by blending (c) a base resin and (d) a non-ionomer thermoplastic elastomer in a weight ratio of 100:0 to 50:50, (e) a fatty acid having 18-80 carbon atoms and/or a derivative thereof, (f) a metal ion source capable of neutralizing acid groups left unneutralized in the component (c) and the component (e), and (g) a compound having two or more reactive functional groups and a molecular weight of 20,000 or less; and wherein (c) the base resin is one or two or more selected from the group consisting of (c-1) an olefin-unsaturated carboxylic acid binary random copolymer and a metal ion-neutralized product of an olefin-unsaturated carboxylic acid binary random copolymer, and (c-2) an olefin-unsaturated carboxylic acid-unsaturated carboxylic acid ester ternary random copolymer and a metal ion-neutralized product of an olefin-unsaturated carboxylic acid-unsaturated carboxylic acid ester ternary random copolymer.

Japanese Patent Publication No. 2001-348467 A discloses a golf ball resin composition obtained by blending 100 parts by mass of (A) a thermoplastic resin component and 0.1 to 10 parts by mass of (B) a wax component, wherein the component (A) is at least one selected from the group consisting of (a-1) an olefin-unsaturated carboxylic acid random copolymer and/or an olefin-unsaturated carboxylic acid-unsaturated carboxylic acid ester ternary random copolymer, (a-2) a metal ion-neutralized product of an olefin-unsaturated carboxylic acid random copolymer and/or a metal ion-neutralized product of an olefin-unsaturated carboxylic acid-unsaturated carboxylic acid ester ternary random copolymer, and (a-3) a thermoplastic elastomer; and the component (B) is at least one selected from the group consisting of (b-1) a fatty acid having 20 to 80 carbon atoms and/or a derivative thereof, and (b-2) a natural wax oxide and/or a natural wax derivative each having a neutralization value of 60-190 mgKOH/g.

Japanese Patent Publication No. 2013-78563 A discloses a golf ball resin composition comprising: (A) at least one selected from the group consisting of (a-1) a binary copolymer composed of an olefin and an α,β-unsaturated carboxylic acid having 3 to 8 carbon atoms, (a-2) a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) a metal ion-neutralized product of a ternary copolymer composed of an olefin, an α,β-unsaturated carboxylic acid having 3 to 8 carbon atoms and an α,β-unsaturated carboxylic acid ester; and (B) a compound having a hydrocarbon chain, a cationic moiety and an anionic moiety in its molecule.

SUMMARY OF THE INVENTION

As a method to improve a flight distance of a golf ball using an ionomer resin having a high stiffness for an intermediate layer or a cover, there is a method to use a high resilience ionomer resin having a high degree of neutralization. However, the ionomer resin having a high degree of neutralization shows a low fluidity, and thus, for example, injection molding a thin cover or intermediate layer is extremely difficult. As a method to improve the fluidity of the ionomer resin, for example, a fatty acid or a metal salt thereof is added to the ionomer resin. However, if the added amount is a certain amount or less, the fluidity improvement effect is low, while if the added amount is a certain amount or more, there are problems that the resultant material shows lowered mechanical properties and the obtained golf ball shows a lowered durability. Further, although the ionomer resin shows a high stiffness, there are problems that the ionomer resin exhibits a low softness and a low rebound resilience.

The present invention has been achieved in view of the above circumstances. An object of the present invention is to provide a golf ball resin composition excellent in rebound resilience and bending stiffness. Another object of the present invention is to provide a golf ball excellent in resilience and shot feeling.

The present invention provides a golf ball resin composition comprising: (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, (B) a saturated fatty acid, and (C) an unsaturated fatty acid, wherein a total content of (B) the saturated fatty acid and (C) the unsaturated fatty acid ranges from 100 parts by mass to 200 parts by mass with respect to 100 parts by mass of (A) the resin component.

In the present invention, if (B) the saturated fatty acid and (C) the unsaturated fatty acid are used in combination in a total added amount ranging from 100 parts by mass to 200 parts by mass with respect to 100 parts by mass of (A) the resin component, the bending stiffness and the rebound resilience of the obtained golf ball resin composition can be improved simultaneously. It is considered that the size of an ion association formed in the ionomer resin and thickness of a constrained layer surrounding the ion association affect remarkably material properties of the golf ball resin composition comprising the ionomer resin. In the present invention, (B) the saturated fatty acid has a similar structure to the polyolefin chain moiety of (A) the resin component that is a base resin, and thus shows a high affinity for the polyolefin chain moiety. Accordingly, (B) the saturated fatty acid is considered to be mainly dispersed in the matrix of the base resin and function to improve the bending stiffness of the ionomer resin. The molecular chain of (C) the unsaturated fatty acid bends at the unsaturated bond in the hydrocarbon chain moiety thereof, and thus (C) the unsaturated fatty acid is, for example, in a shape of bending like a letter of "V". Accordingly, (C) the unsaturated fatty acid shows a lower affinity for the polyolefin chain moiety of the base resin than the saturated fatty acid. (C) The unsaturated fatty acid is considered to be mainly taken into the ion association formed by the base resin and function to improve the rebound resilience of the ionomer resin. The golf ball according to the present invention comprises a constituting member formed from the above golf ball resin composition excellent in bending stiffness and rebound resilience, and thus is excellent in resilience.

Further, (B) the saturated fatty acid and (C) the unsaturated fatty acid impart softness to the golf ball resin composition while improving the fluidity of the golf ball resin composition. Therefore, the golf ball using the golf ball resin composition according to the present invention shows a more excellent resilience and travels a greater flight distance on driver shots while maintaining the productivity and shot feeling thereof, compared to the golf ball using a golf ball resin composition only comprising the saturated fatty acid or unsaturated fatty acid.

The present invention further includes a golf ball comprising a constituting member formed from the golf ball resin composition according to the present invention. The golf ball according to the present invention using the golf ball resin composition excellent in bending stiffness and rebound resilience, travels a great flight distance on driver shots.

According to the present invention, a golf ball resin composition excellent in bending stiffness and rebound resilience is obtained. Further, the golf ball resin composition according to the present invention shows a high fluidity and softness. Therefore, the golf ball using the golf ball resin composition according to the present invention shows excellent resilience and shot feeling.

BRIEF DESCRIPTION OF THE DRAWINGS

FIG. 1 is a partially cutaway sectional view showing a golf ball of one embodiment according to the present invention.

DESCRIPTION OF THE PREFERRED EMBODIMENT

The present invention provides a golf ball resin composition comprising: (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, (B) a saturated fatty acid, and (C) an unsaturated fatty acid, wherein a total content of (B) the saturated fatty acid and (C) the unsaturated fatty acid ranges from 100 parts by mass to 200 parts by mass with respect to 100 parts by mass of (A) the resin component.

First, (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, used in the present invention, will be explained.

The above (a-1) component is a nonionic binary copolymer composed of an olefin and an α,β-unsaturated carboxylic acid having 3 to 8 carbon atoms wherein the carboxyl groups thereof are not neutralized. Further, examples of the above (a-2) component include an ionomer resin prepared by neutralizing at least a part of carboxyl groups in a binary copolymer composed of an olefin and α,β-unsaturated carboxylic acid having 3 to 8 carbon atoms with a metal ion.

The above (a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. Examples of the above (a-4) component include an ionomer resin prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion.

In the present invention, it is noted that "(a-1) a binary copolymer composed of an olefin and an α,β-unsaturated carboxylic acid having 3 to 8 carbon atoms" is sometimes merely referred to as "a binary copolymer", "(a-2) an ionomer resin consisting of a metal ion-neutralized product of a binary copolymer composed of an olefin and an α,β-unsaturated carboxylic acid having 3 to 8 carbon atoms" is sometimes referred to as "a binary ionomer resin", "(a-3) a ternary copolymer composed of an olefin, an α,β-unsaturated carboxylic acid having 3 to 8 carbon atoms, and an α,β-unsaturated carboxylic acid ester" is sometimes merely referred to as "a ternary copolymer", and "(a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "a ternary ionomer resin".

The olefin is preferably an olefin having 2 to 8 carbon atoms, and examples thereof include ethylene, propylene, butene, pentene, hexene, heptene, and octene. In particular, ethylene is preferred. Examples of the α,β-unsaturated carboxylic acid having 3 to 8 carbon atoms include acrylic acid, methacrylic acid, fumaric acid, maleic acid and crotonic acid. In particular, acrylic acid and methacrylic acid are preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred.

(a-1) The binary copolymer is preferably a binary copolymer composed of ethylene and (meth)acrylic acid. (a-2) The binary ionomer resin is preferably a metal ion-neutralized product of a binary copolymer composed of ethylene-(meth)acrylic acid. (a-3) The ternary copolymer is preferably a ternary copolymer composed of ethylene, (meth)acrylic acid and (meth)acrylic acid ester. (a-4) The ternary ionomer resin is preferably a metal ion-neutralized product of a ternary copolymer composed of ethylene, (meth)acrylic acid and (meth)acrylic acid ester. Here, (meth)acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 7 mass % or more, even more preferably 8 mass % or more, and particularly preferably 9 mass % or more, and is preferably 30 mass % or less, more preferably 25 mass % or less, and particularly preferably 20 mass % or less.

The melt flow rate (190° C., 2.16 kgf) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, and even more preferably 1,300 g/10 min or less. If the melt flow rate (190° C., 2.16 kgf) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kgf) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer having a trade name of "NUCREL (registered trademark) (e.g. "NUCREL N1560", "NUCREL N2060", "NUCREL N1108C", "NUCREL N0908C", "NUCREL N1050H", "NUCREL N2050H", "NUCREL N1110H", "NUCREL N0200H")" commercially available from Du Pont-Mitsui Polychemicals Co. Ltd., and an ethylene-acrylic acid copolymer having a trade name of "PRIMACOR (registered trademark) 59801" commercially available from Dow Chemical Company.

Specific examples of (a-3) the ternary copolymer include trade name "NUCREL (registered trademark) (e.g. "NUCREL AN4318", "NUCREL AN4319")" commercially available from Du Pont-Mitsui Polychemicals Co, Ltd., trade name "NUCREL (registered trademark) (e.g. "NUCREL AE")" commercially available from E.I. du Pont de Nemours and Company, and trade name "PRIMACOR (registered trademark) (e.g. "PRIMACOR AT310", "PRIMACOR AT320")" commercially available from Dow Chemical Company. (a-1) The binary copolymer or (a-3) the ternary copolymer may be used alone, or at least two kinds of them may be used in combination.

The content of the α,β-unsaturated carboxylic acid component having 3 to 8 carbon atoms in (a-2) the binary ionomer resin is preferably 4 mass % or more, more preferably 7 mass % or more, even more preferably 8 mass % or more, and particularly preferably 9 mass % or more, and is preferably 30 mass % or less, more preferably 25 mass % or less, and even more preferably 20 mass % or less. If the content of the α,β-unsaturated carboxylic acid component having 3 to 8 carbon atoms is 4 mass % or more, the resultant constituent member may easily show a desirable hardness. If the content of the α,β-unsaturated carboxylic acid component having 3 to 8 carbon atoms is 30 mass % or less, the resultant constituent member does not show an excessively high hardness, so the durability and shot feeling thereof become better.

The degree of neutralization of the carboxyl groups in (a-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, if the degree of neutralization is 90 mole % or less, the golf ball resin composition has better fluidity (good moldability). It is noted that the degree of neutralization of the carboxyl groups in (a-2) the binary ionomer resin can be calculated by the following expression.

The degree of neutralization (mole %) of the binary ionomer resin=(the number of moles of the carboxyl groups neutralized in the binary ionomer resin/the number of moles of all the carboxyl groups in the binary ionomer resin)×100

Examples of the metal ion used for neutralizing at least a part of the carboxyl groups in (a-2) the binary ionomer resin include a monovalent metal ion such as sodium, potassium, lithium, or the like; a divalent metal ion such as magnesium, calcium, zinc, barium, cadmium, or the like; a trivalent metal ion such as aluminum or the like; and other metal ion such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include trade name "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resin exemplified above may be used alone or as a mixture of at least two of them. It is noted that Na, Zn, Li, Mg and the like described in the parentheses after the trade name indicates a metal type of the neutralizing metal ion of the binary ionomer resin.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, and even more preferably 450 MPa or less. If the bending stiffness of (a-2) the binary ionomer resin is too low, the golf ball tends to travel a short flight distance because of the increased spin rate thereof, and if the bending stiffness is too high, the durability of the golf ball may be lowered.

(a-2) The binary ionomer resin preferably has a melt flow rate (190° C., 2.16 kgf) of 0.1 g/10 min or more, more preferably 0.5 g/10 min or more, and even more preferably 1.0 g/10 min or more, and preferably has a melt flow rate (190° C., 2.16 kgf) of 30 g/10 min or less, more preferably 20 g/10 min or less, and even more preferably 15 g/10 min or less. If the melt flow rate (190° C., 2.16 kgf) of (a-2) the binary ionomer resin is 0.1 g/10 min or more, the golf ball resin composition has better fluidity and thus, for example, a thin layer may be molded. In addition, if the melt flow rate (190° C., 2.16 kgf) of (a-2) the binary ionomer resin is 30 g/10 min or less, the durability of the resultant golf ball becomes better.

(a-2) The binary ionomer resin preferably has a slab hardness of 50 or more, more preferably 55 or more, and even more preferably 60 or more, and preferably has a slab hardness of 75 or less, more preferably 73 or less, and even more preferably 70 or less in Shore D hardness. If the binary ionomer resin has a slab hardness of 50 or more in Shore D hardness, the resultant constituent member has a high hardness. In addition, if the binary ionomer resin has a slab hardness of 75 or less in Shore D hardness, the resultant constituent member does not become excessively hard, and thus the golf ball has better durability.

The content of the α,β-unsaturated carboxylic acid component having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the golf ball resin composition has better resilience and durability. If the degree of neutralization is 90 mole % or less, the golf ball resin composition has better fluidity (good moldability). It is noted that the degree of neutralization of the carboxyl groups in the ionomer resin can be calculated by the following expression.

The degree of neutralization (mole %) of the ionomer resin=(the number of moles of the carboxyl groups neutralized in the ionomer resin/the number of moles of all the carboxyl groups in the ionomer resin)×100

Examples of the metal ion used for neutralizing at least a part of the carboxyl groups in (a-4) the ternary ionomer resin include a monovalent metal ion such as sodium, potassium, lithium, or the like; a divalent metal ion such as magnesium, calcium, zinc, barium, cadmium, or the like; a trivalent metal ion such as aluminum or the like; and other metal ion such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na))" commercially available from Du Pont-Mitsui Polychemicals Co., Ltd. Further, examples of the ternary ionomer resin commercially available from E.I. du Pont de Nemours and Company include trade name "Surlyn 6320 (Mg), Surlyn 8120 (Na), Surlyn 8320 (Na), Surlyn 9320 (Zn), Surlyn 9320W (Zn), HPF1000 (Mg), HPF2000 (Mg), or the like". The ternary ionomer resin commercially available from ExxonMobil Chemical Corporation include trade name "Iotek 7510 (Zn), Iotek 7520 (Zn), or the like". It is noted that Na, Zn, Mg or the like described in the parentheses after the trade name indicates a metal type of the neutralizing metal ion. (a-4) The ternary ionomer resin may be used alone, or at least two kinds of them may be used in combination.

(a-4) The ternary ionomer resin preferably has a bending stiffness of 10 MPa or more, more preferably 11 MPa or more, and even more preferably 12 MPa or more, and preferably has a bending stiffness of 100 MPa or less, more preferably 97 MPa or less, and even more preferably 95 MPa or less. If the bending stiffness of (a-4) the ternary ionomer resin is too low, the golf ball tends to travel a short flight distance because of the increased spin rate thereof, and if the bending stiffness is too high, the durability of the golf ball may be lowered.

(a-4) The ternary ionomer resin preferably has a melt flow rate (190° C., 2.16 kgf) of 0.1 g/10 min or more, more preferably 0.3 g/10 min or more, and even more preferably 0.5 g/10 min or more, and preferably has a melt flow rate (190° C., 2.16 kgf) of 20 g/10 min or less, more preferably 15 g/10 min or less, and even more preferably 10 g/10 min or less. If the melt flow rate (190° C., 2.16 kgf) of (a-4) the ternary ionomer resin is 0.1 g/10 min or more, the golf ball resin composition has better fluidity and thus it is easy to mold a thin layer. In addition, if the melt flow rate (190° C., 2.16 kgf) of (a-4) the ternary ionomer resin is 20 g/10 min or less, the durability of the resultant golf ball becomes better.

(a-4) The ternary ionomer resin preferably has a slab hardness of 20 or more, more preferably 25 or more, and even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. In addition, if the ternary ionomer resin has a slab hardness of 70 or less in Shore D hardness, the resultant constituent member does not become excessively hard and thus the golf ball has better durability.

As (A) the resin component, (a-1) the binary copolymer, (a-2) the binary ionomer resin, (a-3) the ternary copolymer, and (a-4) the ternary ionomer resin may be used alone or as a mixture of at least two of them.

Next, (B) the saturated fatty acid will be described. (B) The saturated fatty acid used in the present invention is not particularly limited as long as it is a fatty acid without an unsaturated bond in its hydrocarbon moiety. (B) The saturated fatty acid has a similar structure to the polyolefin chain moiety of (A) the resin component that is a base resin, and thus shows a high affinity for the polyolefin chain moiety. Accordingly, (B) the saturated fatty acid is considered to be mainly dispersed in the matrix of the base resin and function to improve the bending stiffness of the resin. The saturated fatty acid may be a linear saturated fatty acid or a branched saturated fatty acid, but the linear saturated fatty acid is preferred in light of its increased affinity for the polyolefin chain moiety of (A) the resin component that is a base resin.

(B) The saturated fatty acid is not particularly limited, but it is preferably a saturated fatty acid having 4 to 30 carbon atoms, more preferably a saturated fatty acid having 12 to 30 carbon atoms, and even more preferably a saturated fatty acid having 16 to 30 carbon atoms.

Specific examples of (B) the saturated fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of (B) the saturated fatty acid (common name) include butyric acid (C4), valeric acid (C5), caproic acid (C6), enanthic acid (C7), caprylic acid (C8), pelargonic acid (C9), capric acid (C10), lauric acid (C12), myristic acid (C14), pentadecylic acid (C15), palmitic acid (C16), margaric acid (C17), stearic acid (C18), arachidic acid (C20), behenic acid (C22), lignoceric acid (C24), cerotic acid (C26), montanic acid (C28), and melissic acid (C30).

The saturated fatty acid may be used alone or as a mixture of at least two of them. Among them, as (B) the saturated fatty acid, palmitic acid, stearic acid, arachidic acid, behenic acid, lignoceric acid, and montanic acid are preferred.

Next, (C) the unsaturated fatty acid will be described. (C) The unsaturated fatty acid used in the present invention is not particularly limited as long as it is a fatty acid with at least one unsaturated bond in its hydrocarbon moiety. The molecular chain of (C) the unsaturated fatty acid bends at the unsaturated bond in the hydrocarbon chain moiety thereof, and thus (C) the unsaturated fatty acid is, for example, in a shape of bending like a letter of "V". Accordingly, (C) the unsaturated fatty acid shows a lower affinity for the polyolefin chain moiety of the base resin than the saturated fatty acid. (C) The unsaturated fatty acid is considered to be mainly taken into the ion association formed in the base resin and function to improve the rebound resilience of the resin. Examples of the unsaturated bond include a carbon-carbon double bond and a carbon-carbon triple bond, and the carbon-carbon double bond is preferred in light of its easily bending molecular chain. In addition, examples of the carbon-carbon double bond include a cis-double bond and a trans-double bond, and the cis-double bond is more preferred.

(C) The unsaturated fatty acid is not particularly limited, but it is preferably an unsaturated fatty acid having 4 to 30 carbon atoms, and more preferably an unsaturated fatty acid having 12 to 30 carbon atoms.

Specific examples of (C) the unsaturated fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of (C) the unsaturated fatty acid (common name) include myristoleic acid (C14), palmitoleic acid (C16), stearidonic acid (C18), elaidic acid (C18), vaccenic acid (C18), oleic acid (C18), linoleic acid (C18), linolenic acid (C18), elaidic acid (C18), gadoleic acid (C20), arachidonic acid (C20), eicosenoic acid (C20), eicosapentaenoic acid (C20), eicosadienoic acid (C20), docosahexaenoic acid (C22), erucic acid (C22), and nervonic acid (C24).

The unsaturated fatty acid may be used alone or as a mixture of at least two of them. Among them, as (C) the unsaturated fatty acid, palmitoleic acid, oleic acid, linoleic acid, and arachidonic acid are preferred.

The total content of (B) the saturated fatty acid and (C) the unsaturated fatty acid in the golf ball resin composition according to the present invention ranges from 100 parts by mass to 200 parts by mass with respect to 100 parts by mass of (A) the resin component. The total content is preferably 110 parts by mass or more, more preferably 115 parts by mass or more, and even more preferably 120 parts by mass or more, and is preferably 190 parts by mass or less, more preferably 170 parts by mass or less, and even more preferably 160 parts by mass or less, with respect to 100 parts by mass of (A) the resin component. If the total content of (B) the saturated fatty acid and (C) the unsaturated fatty acid is 100 parts by mass or more, a material showing improved rebound resilience and bending stiffness and excellent fluidity and softness, is obtained. The golf ball using such material shows excellent resilience and thus travels a great flight distance on driver shots, while showing good productivity and shot feeling. In addition, if the total content of (B) the saturated fatty acid and (C) the unsaturated fatty acid is 200 parts by mass or less, the lowering of the durability of the golf ball due to the increase of low-molecular weight components can be suppressed.

The mass ratio (B)/(C) of (B) the saturated fatty acid to (C) the unsaturated fatty acid is not particularly limited, but it is preferably 10/90 or more, more preferably 15/85 or more, even more preferably 20/80 or more, and particularly preferably 30/70 or more, and is preferably 90/10 or less, more preferably 85/15 or less, even more preferably 80/20 or less, and particularly preferably 70/30 or less. If the mass ratio (B)/(C) of (B) the saturated fatty acid to (C) the unsaturated fatty acid falls within the above range, a material showing improved rebound resilience and bending stiffness and excellent fluidity and softness, may be easily obtained.

The golf ball resin composition according to the present invention may further comprise (D) an amphoteric surfactant. (D) The amphoteric surfactant is not particularly limited, as long as it has a hydrocarbon chain, a cationic moiety and an anionic moiety in its molecule, and has an action of lowering surface tension when being dissolved in water. It is considered that (D) the amphoteric surfactant is taken into the ion association formed in the ionomer resin to (I) finely disperse the ion association and inhibit crystallization of the ethylene chain, and to (II) weaken constraining of the main chain by the ion association. By these actions, the golf ball resin composition according to the present invention shows increased molecular chain mobility and increased resilience while maintaining its softness.

Examples of (D) the amphoteric surfactant include a betaine type amphoteric surfactant, amidoamino acid type amphoteric surfactant, alkylamino fatty acid salt type amphoteric surfactant, alkylamine oxide type amphoteric surfactant, β-alanine type amphoteric surfactant, glycine type amphoteric surfactant, sulfobetaine type amphoteric surfactant, and phosphobetaine type amphoteric surfactant. These amphoteric surfactants may be used alone or as a mixture of at least two of them. Among them, as (D) the amphoteric surfactant, the betaine type amphoteric surfactant is preferred.

Specific examples of the amphoteric surfactant include dimethyllaurylbetaine, oleylbetaine, dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, and N,N-dimethylstearylamine oxide.

The content of (D) the amphoteric surfactant is preferably 1 part by mass or more, more preferably 3 parts by mass or more, and even more preferably 5 parts by mass or more, and is preferably 20 parts by mass or less, more preferably 15 parts by mass or less, and even more preferably 10 parts by mass or less, with respect to 100 parts by mass of (A) the resin component. If the content of (D) the amphoteric surfactant falls within the above range, the surfactant molecules are easily taken into the ion association formed in the ionomer resin, and thus the ionomer resin shows increased molecular chain mobility and increased resilience while maintaining its softness.

The golf ball resin composition according to the present invention may further comprise (E) a metal compound. (E) The metal compound is used to neutralize the unneutralized carboxyl groups in the golf ball resin composition, and is added where necessary. Examples of (E) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. These (E) metal compounds may be used alone, or at least two of them may be used in combination.

In the present invention, a total degree of neutralization of the acid groups in the resin composition is preferably more than 80 mole %, more preferably 85 mole % or more, even more preferably 90 mole % or more, and is preferably 150 mole % or less, more preferably 125 mole % or less. If the total degree of neutralization is more than 80 mole %, the amount of ion associations becomes larger and thus the resilience becomes higher, and if the total degree of neutralization is 150 mole % or less, the metal that is not involved in the ion association does not exist, and thus no bad influence on the resilience happens, and the resilience becomes higher. The total degree of neutralization is defined by the following expression.

The total degree of neutralization (%)=[Σ(the number of moles of the cation components×the valence of the cation components in the resin composition)/Σ(the number of moles of the anion components×the valence of the anion components in the resin composition)]×100

In the expression, Σ(the number of moles of the cation components×the valence of the cation components in the resin composition) is equal to the number of moles of the cation components×the valence of the cation components in (A) the resin component+the number of moles of the cation-forming groups or the cation components×the valence of the cation-forming groups or the cation components in (D) the amphoteric surfactant+the number of moles of the metal components×the valence of the metal components in (E) the metal compound, and Σ(the number of moles of the anion components×the valence of the anion components in the resin composition) is equal to the number of moles of the carboxyl groups in (A) the resin component+the number of moles of the carboxyl groups in (B) the saturated fatty acid+the number of moles of the carboxyl groups in (C) the unsaturated fatty acid+the number of moles of the anion-forming groups×the valence of the anion-forming groups in (D) the amphoteric surfactant. It is noted that the above cation components, cation-forming groups, metal components, carboxyl groups, and anion-forming groups also include unionized precursors thereof. However, it is also noted that hydrogen atom (H) or proton (H$^+$), for example, hydrogen atom (H) or proton (H$^+$) of (B) and (C) components, do not belong to the cation components and cation-forming groups and that hydroxyl group (OH$^-$), for example hydroxyl group (OH$^-$) of (E) component do not belong to anion components and anion-forming groups. The amount of the cation components, cation-forming groups, and anion-forming groups can be measured, for example, by the neutralization titration method.

Examples of the acid group in the resin composition include a carboxyl group, sulfo group, and sulfate group.

The golf ball resin composition according to the present invention preferably comprises only (A) the resin component as the resin component, however, the golf ball resin composition may comprise another thermoplastic elastomer or thermoplastic resin, as long as they do not impair the effect of the present invention. In the case that the golf ball resin composition comprises another thermoplastic elastomer or thermoplastic resin, the content of (A) the resin component in the resin component is preferably 50 mass % or more, more preferably 60 mass % or more, and even more preferably 70 mass % or more.

Specific examples of another thermoplastic elastomer include a thermoplastic polyamide elastomer having a trade name of "Pebax (e.g. "Pebax 2533")" commercially available from Arkema K. K., a thermoplastic polyurethane elastomer having a trade name of "Elastollan (e.g. "Elastollan XNY85A")" commercially available from BASF Japan Ltd., a thermoplastic polyester elastomer having a trade name of "Hytrel (e.g. "Hytrel 3548", "Hytrel 4047")" commercially available from Du Pont-Toray Co. Ltd., and a thermoplastic styrene elastomer having a trade name of "Rabalon (e.g. "Rabalon T3221C")" commercially available from Mitsubishi Chemical Corporation.

The golf ball resin composition according to the present invention may further comprise a pigment component such as a white pigment (e.g. titanium oxide) and a blue pigment, weight adjusting agent, dispersant, antioxidant, ultraviolet absorber, light stabilizer, fluorescent material or fluorescent brightener, or the like, as long as they do not impair the performance of the golf ball.

The content of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component. If the content of the white pigment is 0.5 part by mass or more, it is possible to impart the opacity to the resultant golf ball constituent member. In addition, if the content of the white pigment is more than parts by mass, the durability of the resultant golf ball may deteriorate.

The golf ball resin composition according to the present invention can be obtained, for example, by dry blending (A) component, (B) component and (C) component, and where necessary (D) component and (E) component. Further, the dry blended mixture may be extruded into a pellet form. The dry blending may be carried out using for example, a mixer capable of blending raw materials in a pellet form, more preferably a tumbler type mixer. Extruding can be carried out using a publicly known extruder such as a single-screw extruder, twin-screw extruder, and twin-single extruder.

The golf ball resin composition according to the present invention preferably has a hardness of 20 or more, more preferably 25 or more, and even more preferably 30 or more in shore D hardness, and preferably has a hardness of 80 or less, more preferably 77 or less, and even more preferably 75 or less in shore D hardness. If the golf ball resin composition having a hardness of 20 or more in shore D hardness is used, a golf ball excellent in resilience (flight distance) can be obtained. On the other hand, if the golf ball resin composition having a hardness of 80 or less in shore D hardness is used, a golf ball excellent in shot feeling can be obtained. Herein, the hardness of the golf ball resin composition is a slab hardness of the golf ball resin composition that is molded into a sheet form, and is measured according to the measurement method described later.

The golf ball resin composition according to the present invention preferably has a melt flow rate (190° C., 2.16 kgf) of 0.01 g/10 min or more, more preferably 0.05 g/10 min or more, even more preferably 0.1 g/10 min or more, particularly preferably 1.0 g/10 min or more, and most preferably 3.0 g/10 min or more. In addition, the golf ball resin composition according to the present invention preferably has a melt flow rate (190° C., 2.16 kgf) of 100 g/10 min or less, more preferably 80 g/10 min or less, and even more preferably 50 g/10 min or less. If the golf ball resin composition has a melt flow rate falling within the above range, the moldability into the golf ball constituent member is better.

The golf ball resin composition according to the present invention preferably has a bending stiffness of 10 MPa or more, more preferably 20 MPa or more, even more preferably 50 MPa or more, and particularly preferably 100 MPa or more, and preferably has a bending stiffness of 450 MPa or less, more preferably 400 MPa or less, even more preferably 350 MPa or less, and particularly preferably 300 MPa or less. If the golf ball resin composition having a bending stiffness of 10 MPa or more is used, a golf ball excellent in resilience (flight distance) can be obtained. On the other hand, if the bending stiffness is 450 MPa or less, the obtained golf ball becomes appropriately soft and thus the shot feeling thereof becomes better.

The golf ball resin composition according to the present invention preferably has a rebound resilience of 40% or more, more preferably 45% or more, even more preferably 50% or more, and most preferably 60% or more. If the golf ball resin composition having a rebound resilience of 40% or more is used, a golf ball excellent in resilience (flight distance) can be obtained. Herein, the bending stiffness and the rebound resilience are the measurement values of the golf ball resin composition that is molded into a sheet form, and are measured according to the measurement method described later.

The golf ball according to the present invention is not particularly limited, as long as it comprises a constituent member formed from the golf ball resin composition according to the present invention. For example, in a two-piece golf ball comprising a single-layered core and a cover disposed around the core, in a three-piece golf ball comprising a core, a single-layered intermediate layer disposed around the core, and a cover disposed around the intermediate layer, or in a multi-piece golf ball (including the above three-piece golf ball) comprising a core, at least one intermediate layer disposed around the core, and a cover disposed around the intermediate layer, any one of the constituent members may be formed from the above golf ball resin composition. Among them, the golf ball comprising an intermediate layer formed from the golf ball resin composition according to the present invention is preferred.

In the following, the golf ball according to the present invention will be described in detail, with respect to one preferable embodiment of a golf ball (including a three-piece golf ball) comprising a core, at least one intermediate layer disposed around the core, and a cover disposed around the cover, at least one of the intermediate layers being formed from the golf ball resin composition according to the present invention. However, the present invention is not limited to this embodiment.

In the above preferable embodiment, the core construction of the golf ball according to the present invention may be a single-layered core or a multi-layered core.

The core generally has a spherical shape, but ribs may be provided thereon in a manner of dividing the surface of the spherical core. A conventionally known rubber composition (hereinafter, sometimes simply referred to as "core rubber composition") may be employed for the core, and the core can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber include a polybutadiene rubber, a natural rubber, a polyisoprene rubber, a styrene polybutadiene rubber, and an ethylene-propylene-diene rubber (EPDM). Among them, typically preferred is a high cis-polybutadiene having cis-bond in a proportion of 40 mass % or more, more preferably 70 mass % or more, and even more preferably 90 mass % or more in view of its superior resilience property.

The crosslinking initiator is blended to crosslink the base rubber component. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.3 part by mass or more, more preferably 0.4 part by mass or more, and is preferably 5 parts by mass or less, more preferably 3 parts by mass or less, with respect with 100 parts by mass of the base rubber. If the amount of the crosslinking initiator is less than 0.3 part by mass, the core becomes so soft that the resilience tends to be lowered, and if the amount of the crosslinking initiator is more than 5 parts by mass, the amount of the co-crosslinking agent must be decreased to obtain an appropriate hardness, which tends to cause the insufficient resilience.

The co-crosslinking agent is considered to have an action of crosslinking the rubber molecules by graft polymerization to the base rubber molecular chain. Examples of the co-crosslinking agent include an β,β-unsaturated carboxylic acid having 3 to 8 carbon atoms, and a metal salt thereof, and preferable examples are acrylic acid, methacrylic acid, and metal salts thereof. Examples of the metal constituting the metal salt include zinc, magnesium, calcium, aluminum and sodium, and zinc is preferably used because it provides high resilience.

The amount of the co-crosslinking agent is preferably 10 parts by mass or more, more preferably 15 parts by mass or more, and even more preferably 20 parts by mass or more, and is preferably 55 parts by mass or less, more preferably 50 parts by mass or less, and even more preferably 48 parts by mass or less, with respect to 100 parts by mass of the base rubber. If the amount of the co-crosslinking agent is less than 10 parts by mass, the amount of the crosslinking initiator must be increased to obtain an appropriate hardness, which tends to lower the resilience. On the other hand, if the amount of the co-crosslinking agent is more than 55 parts by mass, the core becomes so hard that the shot feeling may be lowered.

The filler contained in the core rubber composition is mainly blended as a weight adjusting agent to adjust the weight of the golf ball obtained as the final product, and may be blended where necessary. Examples of the filler include an inorganic filler such as zinc oxide, barium sulfate, calcium carbonate, magnesium oxide, tungsten powder, and molybdenum powder. The amount of the filler is preferably 0.5 part by mass or more, more preferably 1 part by mass or more, and is preferably 30 parts by mass or less, more preferably 20 parts by mass or less, with respect to 100 parts by mass of the base rubber. If the amount of the filler is less than 0.5 part by mass, it becomes difficult to adjust the weight, and if the amount of the filler is more than 30 parts by mass, the weight proportion of the rubber component becomes small and thus the resilience tends to be lowered.

The core rubber composition may appropriately further contain an organic sulfur compound, an antioxidant or a peptizing agent, in addition to the base rubber, the crosslinking initiator, the co-crosslinking agent and the filler.

Examples of the organic sulfur compound include thiophenol and a derivative thereof, thionaphthol and a derivative thereof, polysulfide and a derivative thereof, thiocarboxylic acid and a derivative thereof, dithiocarboxylic acid and a derivative thereof, sulfenaminde and a derivative thereof, thiuram and a derivative thereof, dithiocarbamate and a derivative thereof, and thiazole and a derivative thereof. Among them, thionaphthol and the derivative thereof are preferably used as the organic sulfur compound. Examples of thionaphthol and the derivative thereof include 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, 1-acetyl-2-thionaphthol, and metal salts thereof. Thionaphthol and the derivative thereof can enhance resilience by having some influence on vulcanization state of the vulcanized rubber. Among them, 1-thionaphthol, 2-thionaphthol, and zinc salt thereof are preferably used since the golf ball having particularly high resilience can be obtained. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber.

The amount of the antioxidant is preferably 0.1 part by mass or more and 1 part by mass or less, with respect to 100 parts by mass of the base rubber. Further, the amount of the peptizing agent is preferably 0.1 part by mass or more and 5 parts by mass or less, with respect to 100 parts by mass of the base rubber.

The core can be obtained by mixing and kneading the above mentioned core rubber composition, and molding the obtained composition in a mold. The molding conditions are not particularly limited, but the molding is generally carried out at 130° C. to 200° C. under the pressure of 2.9 MPa to 11.8 MPa for 10 minutes to 60 minutes. For example, the rubber composition is preferably heated at 130° C. to 200° C. for 10 minutes to 60 minutes, alternatively, the rubber composition is preferably molded in a two-step heating, i.e. heated at a temperature ranging from 130° C. to 150° C. for 20 minutes to 40 minutes, and then heated at a temperature ranging from 160° C. to 180° C. for 5 minutes to 15 minutes.

The diameter of the core is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the core is 34.8 mm or more, the intermediate layer or the cover layer does not become excessively thick, and thus the resilience becomes better. On the other hand, if the diameter of the core is 41.2 mm or less, the intermediate layer or the cover layer does not become excessively thin, and thus the intermediate layer or the cover layer functions better.

When the core has a diameter ranging from 34.8 mm to 41.2 mm, the compression deformation amount of the core (shrinking amount of the core along the compression direction) when applying a load from 98 N as an initial load to 1275 N as a final load to the core is preferably 1.90 mm or more, more preferably 2.00 mm or more, and even more preferably 2.10 mm or more, and is preferably 4.00 mm or less, more preferably 3.90 mm or less, and even more preferably 3.80 mm or less. If the compression deformation amount is 1.90 mm or more, the shot feeling becomes better, and if the compression deformation amount is 4.00 mm or less, the resilience becomes better.

The center hardness of the core is preferably 30 or more, more preferably 32 or more, and even more preferably 35 or more in Shore D hardness. If the center hardness of the core is less than 30 in Shore D hardness, the core becomes so soft that the resilience thereof tends to become lower. Further, the center hardness of the core is preferably 70 or less, more preferably 65 or less, and even more preferably 60 or less in Shore D hardness. If the center hardness of the core is more than 70 in Shore D hardness, the core becomes so hard that the shot feeling thereof tends to become lower. In the present invention, the center hardness of the core is a hardness measured with a Shore D type spring durometer at the central point of a cut plane obtained by cutting the core into two halves.

The surface hardness of the core is preferably 45 or more, more preferably or more, and even more preferably 55 or more, and is preferably 85 or less, more preferably 80 or less, and even more preferably 78 or less in Shore D hardness. If the surface hardness of the core is 45 or more in Shore D hardness, the core does not become excessively soft, and thus the better resilience is obtained. If the surface hardness of the core is 85 or less in Shore D hardness, the core does not become excessively hard, and thus the better shot feeling is obtained.

In the preferable embodiment, examples of the method to form the intermediate layer include a method of covering the core with the golf ball resin composition according to the present invention (hereinafter, sometimes merely referred to as "intermediate layer composition") to obtain the intermediate layer. The method to mold the intermediate layer is not particularly limited, and examples thereof include a method of molding the golf ball resin composition into semispherical half shells beforehand, covering the core with two half shells, and subjecting to compression molding at a temperature ranging from 130° C. to 170° C. for 1 minute to 5 minutes; and a method of injection molding the golf ball resin composition directly onto the core to cover the core. The intermediate layer of the golf ball according to the present invention is preferably formed by the injection molding method. This is because the injection molding method can make the production of the intermediate layer more easily.

In the case of injection molding the intermediate layer composition onto the core to form the intermediate layer, it is preferred to use upper and lower molds for molding the intermediate layer, each having a semispherical cavity and a pimple wherein a part of the pimple also serves as a retractable hold pin. When forming the intermediate layer by the injection molding method, the hold pin is protruded to hold the core, and the heated and melted intermediate layer composition is charged and then cooled to form the intermediate layer.

When molding the intermediate layer by the compression molding method, the half shell can be molded by either the compression molding method or the injection molding method, and the compression molding method is preferred. Compression molding the intermediate layer composition into the half shell can be carried out, for example, under a pressure of 1 MPa or more and 20 MPa or less at a molding temperature of −20° C. or more and 70° C. or less relative to the flow beginning temperature of the intermediate layer composition. By performing the molding under the above conditions, the half shell having a uniform thickness can be formed. Examples of the method for molding the intermediate layer using the half shell include a method of covering the core with two half shells and subjecting to compression molding. Compression molding the half shells into the intermediate layer can be carried out, for example, under a molding pressure of 0.5 MPa or more and 25 MPa or less at a molding temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing the mold to opening the mold. Further, the flow beginning temperature of the intermediate layer composition can be measured in a pellet form under the following conditions by using "Flow Tester CFT-500" manufactured by Shimadzu Corporation.

Measuring conditions: Plunger Area: 1 $cm^2$, Die length: 1 mm, Die diameter: 1 mm, Load: 588.399 N, Start temperature: 30° C., and Temperature increase rate: 3° C./min.

The thickness of the intermediate layer is preferably 0.5 mm or more, more preferably 0.6 mm or more, and even more preferably 0.7 mm or more. If the thickness of the intermediate layer is 0.5 mm or more, it is easier to mold the intermediate layer, and the durability of the obtained golf ball is further enhanced. The thickness of the intermediate layer is preferably 15 mm or less, more preferably 14 mm or less, and even more preferably 13 mm or less. If the thickness of the intermediate layer is 15 mm or less, the resilience and shot feeling of the obtained golf ball become better.

In the preferable embodiment, when the golf ball according to the present invention comprises at least two intermediate layers, at least one intermediate layer is formed from the golf ball resin composition according to the present invention, and an intermediate layer formed from an intermediate layer composition other than the golf ball resin composition according to the present invention may be comprised as long as it does not impair the effect of the present invention. In this case, it is preferred that the outermost intermediate layer is the intermediate layer formed from the golf ball resin composition according to the present invention. Further, it is also preferred that all the intermediate layers are formed from the golf ball resin composition according to the present invention.

Examples of the intermediate layer composition other than the golf ball resin composition according to the present invention include, in addition to the core rubber composition and the ionomer resin described above, a thermoplastic polyamide elastomer having a trade name of "Pebax (registered trademark) (e.g. "Pebax 2533")" commercially available from Arkema K. K., a thermoplastic polyester elastomer having a trade name of "Hytrel (registered trademark) (e.g. "Hytrel 3548" and "Hytrel 4047")" commercially available from Du Pont-Toray Co., Ltd., a thermoplastic polyurethane elastomer having a trade name of "Elastollan (registered trademark) (e.g. "Elastollan XNY97A")" commercially available from BASF Japan Ltd., and a thermoplastic styrene elastomer having a trade name of "Rabalon (registered trademark)" commercially available from Mitsubishi Chemical Corporation. The intermediate layer composition may further contain a weight adjusting agent such as barium sulfate, tungsten, or the like; an antioxidant; a pigment; or the like.

In the preferable embodiment, the cover of the golf ball according to the present invention is formed from a cover composition containing a resin component. Examples of the resin component include an ionomer resin, a thermoplastic polyurethane elastomer having a trade name of "Elastollan (registered trademark) (e.g. "Elastollan XNY97A")" commercially available from BASF Japan Ltd., a thermoplastic polyamide elastomer having a trade name of "Pebax (registered trademark) (e.g. "Pebax 2533")" commercially available from Arkema K. K., a thermoplastic polyester elastomer having a trade name of "Hytrel (registered trademark) (e.g. "Hytrel 3548" and "Hytrel 4047")" commercially available from Du Pont-Toray Co., Ltd., a thermoplastic styrene elastomer having a trade name of "Rabalon (registered trademark)" commercially available from Mitsubishi Chemical Corporation. Further, a binary copolymer composed of an olefin and an α,β-unsaturated carboxylic acid having 3 to 8 carbon atoms, and/or a ternary copolymer composed of an olefin, an α,β-unsaturated carboxylic acid having 3 to 8 carbon atoms and an α,β-unsaturated carboxylic acid ester, which are (A) component, may be used. These resin components may be used solely, or at least two of them may be used in combination.

In the preferable embodiment, the cover composition forming the cover of the golf ball preferably contains the thermoplastic polyurethane elastomer or the ionomer resin as the resin component. The content of the thermoplastic polyurethane elastomer or the ionomer resin in the resin component of the cover composition is preferably 50 mass % or more, more preferably 60 mass % or more, and even more preferably 70 mass % or more.

In addition to the aforementioned resin component, the cover composition may further contain a pigment component such as a white pigment (e.g. titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The content of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component forming the cover. If the content of the white pigment is 0.5 part by mass or more, it is possible to impart the opacity to the cover, and if the content of the white pigment is more than 10 parts by mass, the durability of the obtained cover may deteriorate.

The cover composition preferably has a slab hardness of 70 or less, more preferably 68 or less, and even more preferably 65 or less in Shore D hardness. If the cover composition has a slab hardness of 70 or less, the spin rate on approach shots with a short iron increases. As a result, the golf ball having excellent controllability on approach shots is obtained. Further, in order to sufficiently ensure the spin rate on approach shots, the cover composition preferably has a slab hardness of 20 or more, more preferably 25 or more, and even more preferably 30 or more in Shore D hardness.

Examples of the method for molding the cover of the golf ball according to the present invention include a method of molding the cover composition into hollow shells, covering the intermediate layer with a plurality of the hollow shells and subjecting to compression molding (preferably a method of molding the cover composition into hollow half shells, covering the intermediate layer with two half shells and subjecting to compression molding); and a method of injection molding the cover composition directly onto the intermediate layer.

When molding the cover by the compression molding method, the half shell can be molded by either the compression molding method or the injection molding method, and the compression molding method is preferred. Compression molding the cover composition into the half shell can be carried out, for example, under a pressure of 1 MPa or more and 20 MPa or less at a molding temperature of −20° C. or more and 70° C. or less relative to the flow beginning temperature of the cover composition. By performing the molding under the above conditions, the half shell having a uniform thickness can be formed. Examples of the method for molding the cover using the half shell include a method of covering the spherical body having the intermediate layer formed thereon with two half shells and subjecting to compression molding. Compression molding the half shells into the cover can be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, the cover having a uniform thickness can be formed.

In the case of injection molding the cover composition to form the cover, the cover composition extruded in a pellet form may be used for injection molding, or the cover materials such as the base resin components and the pigment may be dry blended, followed by directly injection molding the blend material. It is preferred to use upper and lower molds for molding the cover, each having a semispherical cavity and a pimple wherein a part of the pimple also serves as a retractable hold pin. When forming the cover by the injection molding method, the hold pin is protruded to hold the spherical body having the intermediate layer formed thereon, and the cover composition is charged and then cooled to form the cover. For example, the cover may be formed by charging the cover composition heated to 200° C. to 250° C. into the mold held under a pressure of 9 MPa to 15 MPa for 0.5 second to 5 seconds, cooling the cover composition for 10 seconds to 60 seconds, and opening the mold.

The concave portions called dimples are usually formed on the surface of the cover. The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the formed dimples includes, for example, without limitation, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

The thickness of the cover is preferably 2.0 mm or less, more preferably 1.6 mm or less, even more preferably 1.2 mm or less, and particularly preferably 1.0 mm or less. If the thickness of the cover is 2.0 mm or less, the resilience and the shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover, and the durability and the abrasion resistance of the cover may also deteriorate.

The golf ball body having the cover formed thereon is ejected from the mold, and preferably subjected to surface treatments such as deburring, cleaning and sandblast as necessary. Further, if desired, a paint film or a mark may be formed thereon. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easily wear off due to continued use of the golf ball, and if the thickness of the paint film is more than 50 μm, the dimple effect is reduced and thus the flying performance of the golf ball may deteriorate.

The golf ball according to the present invention preferably has a diameter ranging from 40 mm to 45 mm. In light of satisfying the regulation of US Golf Association (USGA), the diameter is particularly preferably 42.67 mm or more. In light of prevention of the air resistance, the diameter is more preferably 44 mm or less, and particularly preferably 42.80 mm or less. The golf ball according to the present invention preferably has a mass of 40 g or more and 50 g or less. In light of obtaining greater inertia, the mass is more preferably 44 g or more, and particularly preferably 45.00 g or more. In light of satisfying the regulation of USGA, the mass is particularly preferably 45.93 g or less.

When the golf ball according to the present invention has a diameter ranging from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits better shot feeling. On the other hand, if the compression deformation amount is 4.0 mm or less, the resilience of the golf ball is enhanced.

FIG. 1 is a partially cutaway sectional view showing a golf ball 2 according to one embodiment of the present invention. The golf ball 2 comprises a spherical core 104, an intermediate layer 106 covering the spherical core 104, and a cover 112 covering the intermediate layer 106. A plurality of dimples 114 are formed on the surface of the cover 112. Portions other than dimples 114 on the surface of the golf ball are lands 116. The golf ball further comprises a paint layer and a mark layer outside the cover, but these layers are not depicted.

The present invention has been explained by exemplifying the embodiment in which the golf ball resin composition according to the present invention is used for the intermediate layer, however, the golf ball resin composition according to the present invention may be also used as the cover composition.

EXAMPLES

Hereinafter, the present invention will be described in detail by way of examples. However, the present invention is not limited to the examples described below, and various changes and modifications can be made without departing from the spirit and scope of the present invention.
(1) Hardness of Core (Shore D Hardness)

A type P1 auto loading durometer manufactured by Kobunshi Keiki Co., Ltd., provided with a Shore D type spring durometer prescribed in ASTM-D2240 was used to measure the hardness of the core. Shore D hardness measured at the surface of the core was adopted as the surface hardness of the core. The core was cut into two semispheres to obtain a cut plane, and Shore D hardness measured at the central point of the cut plane was adopted as the center hardness of the core.
(2) Slab Hardness (Shore D Hardness)

Sheets with a thickness of about 2 mm were produced by injection molding the cover composition or the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring durometer prescribed in ASTM-D2240.

(3) Compression Deformation Amount (mm)

The compression deformation amount of the core or the golf ball (shrinking amount of the core or the golf ball along the compression direction) when applying a load from 98 N as an initial load to 1275 N as a final load to the core or the golf ball, was measured.
(4) Rebound Resilience (%)

Sheets with a thickness of about 2 mm were produced by heat-pressing the golf ball resin composition. Circle test pieces with a diameter of 28 mm was cut out of the sheet, and six test pieces were stacked to prepare a cylindrical test piece with a thickness of about 12 mm and a diameter of 28 mm. The cylindrical test piece was subjected to the Lupke type rebound resilience test (testing temperature 23° C., testing humidity 50 RH %). It is noted that preparation of the test piece and the testing method were carried out according to JIS K6255.
(5) Bending Stiffness (MPa)

A test piece with a thickness of about 2 mm, a width of 20 mm and a length of 100 mm was prepared by pressing the golf ball resin composition at 170° C. for 10 minutes. An Olsen stiffness tester (manufactured by Toyo Seiki Seisaku-sho, Ltd.) was used to measure the bending stiffness of the prepared test piece at the bending angle of 3° or more and 12° or less, respectively.
(6) Shot Feeling An actual hitting test was carried out with a driver by ten amateur golfers (high skilled persons). Feeling of each person when hitting the golf ball was evaluated according to the following standard. The most-evaluated result among the evaluation results of ten persons was adopted as the shot feeling of the golf ball.
Evaluation Standard
  G (good): Impact is small and feeling is good.
  F (fair): Ordinary
  P (poor): Impact is large and feeling is poor.
(7) Coefficient of Restitution A 198.4 g of metal cylindrical object was allowed to collide with each golf ball at a speed of 40 m/sec, and the speeds of the cylindrical object and the golf ball before and after the collision were measured. Based on these speeds and the mass of each object, the coefficient of restitution for each golf ball was calculated. The measurement was conducted using twelve samples for each golf ball, and the average value thereof was adopted as the coefficient of restitution for the golf ball.
(8) Fluidity The melt flow rate (MFR) (g/10 min) of the golf ball resin composition was measured according to JIS K7210 using a flow tester (Shimadzu Flow Tester CFT-100C manufactured by Shimadzu Corporation), and the fluidity was evaluated according to the following standard. It is noted that the measurement was conducted at a measurement temperature of 190° C. and a load of 2.16 kg.
Evaluation Standard
  G (good): MFR is 3.0 g/10 min or more.
  F (fair): MFR is 1.0 g/10 min or more and less than 3.0 g/10 min.
  P (poor): MFR is less than 1.0 g/10 min.
(9) Flight Distance A metal-headed W#1 driver (XXIO S, loft: 110, manufactured by Dunlop Sports Limited) was installed on a swing robot M/C manufactured by Golf Laboratories, Inc. The golf ball was hit at a head speed of 40 m/sec, and the flight distance (distance from the launch point to the stop point) were measured. The flight distance was evaluated according to the following standard. The measurement was conducted twelve times for each golf ball, and the average value thereof was adopted as the measurement value for the golf ball. The difference between the flight distance of each golf ball and the flight distance of the golf ball obtained in Comparative Example 1 (flight distance difference=flight distance of each golf ball—flight distance of Golf ball No. 15) was calculated, and evaluated according to the following standard.

G (good): Flight distance difference is 3.0 yards or more.
F (fair): Flight distance difference is 0 yard or more and less than 3.0 yards.
P (poor): Flight distance difference is less than 0 yard.

[Production of Golf Ball]
(1) Production of Core

The core rubber composition having the formulation shown in Table 1 was kneaded and heat-pressed in upper and lower molds, each having a semispherical cavity, at 170° C. for 20 minutes to obtain a spherical core. Barium sulfate was added in an appropriate amount such that the obtained golf ball had a mass of 45.4 g.

TABLE 1

| Core rubber composition | Formulation (Parts by mass) |
| --- | --- |
| Polybutadiene rubber | 100 |
| Zinc acrylate | 30 |
| Dicumyl peroxide | 0.5 |
| 2-Thionaphthol | 0.2 |
| Barium sulfate | Appropriate amount *) |
| Diameter of core (mm) | 39.1 |
| Compression deformation amount of core (mm) | 3.86 |
| Center hardness of core (Shore D) | 59.4 |
| Surface hardness of core (Shore D) | 76.0 |

*) Barium sulfate: adjustment was made such that the golf ball had a mass of 45.4 g.

Polybutadiene rubber: "BR-730 (high-cis polybutadiene)" manufactured by JSR Corporation
Zinc acrylate: manufactured by Sigma-Aldrich Corporation
Barium sulfate: "Barium Sulfate BD" manufactured by Sakai Chemical Industry Co., Ltd.
Dicumyl peroxide: manufactured by Tokyo Chemical Industry Co., Ltd.
2-Thionaphthol: manufactured by Tokyo Chemical Industry Co., Ltd.

(2) Preparation of Cover Composition and Intermediate Layer Composition

Materials having the formulation shown in Tables 2 to 5 were mixed with a twin-screw kneading extruder to prepare the intermediate layer composition and the cover composition in a pellet form, respectively. The extruding conditions for the intermediate layer composition were a screw diameter of 45 mm, a screw rotational speed of 200 rpm, a screw L/D=35, and a cylinder temperature of 160° C. to 230° C. The extruding conditions for the cover composition were a screw diameter of 45 mm, a screw rotational speed of 200 rpm, and a screw L/D=35, and the mixture was heated to 160° C. to 230° C. at the die position of the extruder.

TABLE 2

| | | | | Golf ball No. | | | | | | |
| --- | --- | --- | --- | --- | --- | --- | --- | --- | --- | --- |
| | | | | 1 | 2 | 3 | 4 | 5 | 6 | 7 |
| Intermediate layer composition | Formulation (parts by mass) | (A) | Binary copolymer 1 | 100 | — | — | — | — | — | — |
| | | | Binary copolymer 2 | — | 100 | — | — | — | 100 | — |
| | | | Binary copolymer 3 | — | — | — | 100 | — | — | — |
| | | | Binary copolymer 4 | — | — | 100 | — | 100 | — | 100 |
| | | (B) | Behenic acid | 30 | 30 | 60 | 30 | 30 | 30 | 60 |
| | | | Stearic acid | — | — | — | — | — | — | — |
| | | (C) | Oleic acid | 100 | 100 | 40 | 100 | 100 | 100 | 40 |
| | | | Linoleic acid | — | — | — | — | — | — | — |
| | | (D) | Oleylbetaine | 5 | 5 | — | 5 | 5 | 5 | — |
| | | (E) | Magnesium hydroxide | 21.5 | 23.9 | 14.8 | 20.0 | 19.2 | — | — |
| | | | Sodium hydroxide | — | — | — | — | — | 32.8 | 20.3 |
| | Properties | | Total degree of neutralization (mole %) | 120 | 120 | 120 | 120 | 120 | 120 | 120 |
| | | | Slab hardness (Shore D) | 55 | 59 | 54 | 54 | 52 | 55 | 55 |
| | | | Bending stiffness (MPa) | 119 | 122 | 180 | 116 | 113 | 125 | 194 |
| | | | Rebound resilience (%) | 74 | 73 | 63 | 73 | 74 | 71 | 62 |
| | | | Fluidity | G | G | G | G | G | G | G |
| | | | Thickness of intermediate layer (mm) | 1.0 | 1.0 | 1.0 | 1.0 | 1.0 | 1.0 | 1.0 |
| Properties of golf ball | | | Thickness of cover (mm) | 0.8 | 0.8 | 0.8 | 0.8 | 0.8 | 0.8 | 0.8 |
| | | | Compression deformation amount (mm) | 3.25 | 3.03 | 3.31 | 3.31 | 3.43 | 3.25 | 3.25 |
| | | | Coefficient of restitution | 0.780 | 0.778 | 0.764 | 0.777 | 0.779 | 0.774 | 0.763 |
| | | | Flight distance | G | G | G | G | G | G | G |
| | | | Shot feeling | G | G | G | G | G | G | G |

| | | | | Golf ball No. | | | | | | |
| --- | --- | --- | --- | --- | --- | --- | --- | --- | --- | --- |
| | | | | 8 | 9 | 10 | 11 | 12 | 13 | 14 |
| Intermediate layer composition | Formulation (parts by mass) | (A) | Binary copolymer 1 | 100 | 100 | 100 | 100 | 100 | 100 | — |
| | | | Binary copolymer 2 | — | — | — | — | — | — | 100 |
| | | | Binary copolymer 3 | — | — | — | — | — | — | — |
| | | | Binary copolymer 4 | — | — | — | — | — | — | — |
| | | (B) | Behenic acid | 30 | 30 | 30 | 30 | 30 | 30 | 30 |
| | | | Stearic acid | — | — | — | — | — | — | — |
| | | (C) | Oleic acid | 100 | 100 | 100 | 100 | 100 | 100 | 100 |

TABLE 2-continued

|  |  |  | | | | | | | |
|---|---|---|---|---|---|---|---|---|---|
|  |  | Linoleic acid | — | — | — | — | — | — | — |
|  |  | (D) Oleylbetaine | 5 | 5 | 5 | 5 | 5 | 5 | 5 |
|  |  | (E) Magnesium hydroxide | 15.2 | 16.1 | 18.0 | 22.6 | 27.2 | 14.3 | 18.7 |
|  |  | Sodium hydroxide | — | — | — | — | — | — | — |
|  | Properties | Total degree of neutralization (mole %) | 85 | 90 | 100 | 125 | 150 | 80 | 80 |
|  |  | Slab hardness (Shore D) | 54 | 55 | 55 | 55 | 59 | 54 | 56 |
|  |  | Bending stiffness (MPa) | 106 | 110 | 119 | 124 | 135 | 98 | 103 |
|  |  | Rebound resilience (%) | 65 | 69 | 73 | 73 | 71 | 64 | 63 |
|  |  | Fluidity | G | G | G | G | F | G | G |
|  |  | Thickness of intermediate layer (mm) | 1.0 | 1.0 | 1.0 | 1.0 | 1.0 | 1.0 | 1.0 |
| Properties of golf ball |  | Thickness of cover (mm) | 0.8 | 0.8 | 0.8 | 0.8 | 0.8 | 0.8 | 0.8 |
|  |  | Compression deformation amount (mm) | 3.31 | 3.25 | 3.25 | 3.25 | 3.03 | 3.31 | 3.19 |
|  |  | Coefficient of restitution | 0.755 | 0.764 | 0.777 | 0.778 | 0.765 | 0.752 | 0.751 |
|  |  | Flight distance | F | F | G | G | G | F | F |
|  |  | Shot feeling | G | G | G | G | G | G | G |

TABLE 3

| | | | Golf ball No. | | | | | | | | |
|---|---|---|---|---|---|---|---|---|---|---|---|
| | | | 15 | 16 | 17 | 18 | 19 | 20 | 21 | 22 | 23 |
| Intermediate layer composition | Formulation (parts by mass) | (A) Binary copolymer 1 | 100 | 100 | 100 | — | — | — | — | 100 | 100 |
| | | Binary copolymer 2 | — | — | — | 100 | — | — | — | — | — |
| | | Binary copolymer 3 | — | — | — | — | 100 | 100 | 100 | — | — |
| | | Binary copolymer 4 | — | — | — | — | — | — | — | — | — |
| | | (B) Behenic acid | — | 90 | — | 30 | 100 | 30 | 130 | — | 60 |
| | | Stearic acid | — | — | — | — | — | — | — | — | — |
| | | (C) Oleic acid | — | — | 90 | — | — | — | — | 130 | 200 |
| | | Linoleic acid | — | — | — | — | — | — | — | — | — |
| | | (D) Oleylbetaine | — | — | 5 | 30 | — | — | — | 5 | 5 |
| | | (E) Magnesium hydroxide | 6.1 | 15.3 | 17.3 | 11.7 | 13.9 | 6.7 | 17.0 | 19.8 | 34.7 |
| | | Sodium hydroxide | — | — | — | — | — | — | — | — | — |
| | Properties | Total degree of neutralization (mole %) | 120 | 120 | 120 | 120 | 120 | 120 | 120 | 120 | 120 |
| | | Slab hardness (Shore D) | 54 | 50 | 54 | 55 | 59 | 57 | 60 | 50 | 51 |
| | | Bending stiffness (MPa) | 42 | 37 | 73 | 101 | 252 | 165 | 277 | 110 | 88 |
| | | Rebound resilience (%) | 65 | 68 | 69 | 65 | 57 | 57 | 55 | 56 | 54 |
| | | Fluidity | F | G | P | P | G | F | G | G | G |
| | | Thickness of intermediate layer (mm) | 1.0 | 1.0 | 1.0 | 1.0 | 1.0 | 1.0 | 1.0 | 1.0 | 1.0 |
| Properties of golf ball | | Thickness of cover (mm) | 0.8 | 0.8 | 0.8 | 0.8 | 0.8 | 0.8 | 0.8 | 0.8 | 0.8 |
| | | Compression deformation amount (mm) | 3.31 | 3.57 | 3.31 | 3.25 | 3.03 | 3.12 | 2.96 | 3.57 | 3.50 |
| | | Coefficient of restitution | 0.738 | 0.740 | 0.755 | 0.754 | 0.757 | 0.749 | 0.754 | 0.739 | 0.734 |
| | | Flight distance | F | F | F | F | F | F | F | F | P |
| | | Shot feeling | G | G | G | G | G | G | P | G | G |

TABLE 4

| | | | Golf ball No. | | | | | | | |
|---|---|---|---|---|---|---|---|---|---|---|
| | | | 24 | 25 | 26 | 27 | 28 | 29 | 30 | 31 |
| Intermediate layer composition | Formulation (parts by mass) | (A) Binary copolymer 1 | 100 | 100 | 100 | 100 | — | 100 | — | 100 |
| | | Binary copolymer 2 | — | — | — | — | — | — | 100 | — |
| | | Binary copolymer 3 | — | — | — | — | — | — | — | — |
| | | Binary copolymer 4 | — | — | — | — | 100 | — | — | — |
| | | (B) Behenic acid | 50 | — | 90 | 90 | 60 | 30 | 30 | 30 |
| | | Stearic acid | 50 | — | — | — | — | — | — | — |
| | | (C) Oleic acid | — | 50 | — | — | 40 | 30 | 30 | 30 |
| | | Linoleic acid | — | 50 | — | — | — | — | — | — |
| | | (D) Oleylbetaine | — | — | — | — | — | 5 | 5 | — |
| | | (E) Magnesium hydroxide | 17.3 | 17.5 | 5.1 | 10.2 | 7.4 | 13.0 | 15.0 | 12.9 |
| | | Sodium hydroxide | — | — | — | — | — | — | — | — |
| | Properties | Total degree of neutralization (mole %) | 120 | 120 | 40 | 80 | 60 | 120 | 120 | 120 |
| | | Slab hardness (Shore D) | 60 | 51 | 46 | 48 | 51 | 54 | 56 | 51 |

TABLE 4-continued

|  |  | Golf ball No. | | | | | | | |
| --- | --- | --- | --- | --- | --- | --- | --- | --- | --- |
|  |  | 24 | 25 | 26 | 27 | 28 | 29 | 30 | 31 |
|  | Bending stiffness (MPa) | 171 | 48 | 26 | 31 | 105 | 80 | 91 | 118 |
|  | Rebound resilience (%) | 59 | 68 | 51 | 55 | 55 | 65 | 66 | 58 |
|  | Fluidity | P | G | G | G | G | G | F | G |
|  | Thickness of intermediate layer (mm) | 1.0 | 1.0 | 1.0 | 1.0 | 1.0 | 1.0 | 1.0 | 1.0 |
| Properties of golf ball | Thickness of cover (mm) | 0.8 | 0.8 | 0.8 | 0.8 | 0.8 | 0.8 | 0.8 | 0.8 |
|  | Compression deformation amount (mm) | 2.98 | 3.50 | 3.88 | 3.72 | 3.50 | 3.31 | 3.19 | 3.50 |
|  | Coefficient of restitution | 0.753 | 0.745 | 0.721 | 0.725 | 0.737 | 0.749 | 0.754 | 0.744 |
|  | Flight distance | F | F | P | P | P | F | F | F |
|  | Shot feeling | P | G | G | G | G | G | G | G |

Binary copolymer 1: commercially available ethylene-methacrylic acid copolymer (methacrylic acid content: 15 mass %, MFR (190° C., 2.16 kgf): 60 g/10 min, bending stiffness: 81 MPa)
Binary copolymer 2: commercially available ethylene-methacrylic acid copolymer (methacrylic acid content: 20 mass %, MFR (190° C., 2.16 kgf): 60 g/10 min)
Binary copolymer 3: commercially available ethylene-methacrylic acid copolymer (methacrylic acid content: 11 mass %, MFR (190° C., 2.16 kgf): 8 g/10 min, bending stiffness: 140 MPa)
Binary copolymer 4: commercially available ethylene-methacrylic acid copolymer (methacrylic acid content: 9 mass %, MFR (190° C., 2.16 kgf): 8 g/10 min, bending stiffness: 155 MPa)
Behenic acid: manufactured by Tokyo Chemical Industry Co., Ltd.
Stearic acid: manufactured by Tokyo Chemical Industry Co., Ltd.
Oleic acid: manufactured by Tokyo Chemical Industry Co., Ltd.
Linoleic acid: manufactured by Tokyo Chemical Industry Co., Ltd.
Oleylbetaine: obtained by removing water and salt from "Chembetaine OL" manufactured by The Lubrizol Corporation Magnesium hydroxide: manufactured by Wako Pure Chemical Industries, Ltd.
Sodium hydroxide: manufactured by Wako Pure Chemical Industries, Ltd.

TABLE 5

| Cover composition | Formulation (parts by mass) |
| --- | --- |
| Elastollan | 100 |
| Titanium oxide | 4 |
| Slab hardness (Shore D) | 57 |

Elastollan: thermoplastic polyurethane elastomer manufactured by BASF Japan Ltd.
Titanium oxide: A220 manufactured by Ishihara Sangyo Kaisha, Ltd.

(3) Production of Golf Ball Body

The intermediate layer composition obtained above was injection molded onto the core obtained above to form the intermediate layer covering the core. Subsequently, the golf ball was produced by injection molding the cover composition onto the intermediate layer to form the cover. The upper and lower molds for molding the intermediate layer and the cover have a semispherical cavity and a pimple wherein a part of the pimple also serves as a retractable hold pin.

The upper and lower molds for molding the intermediate layer have a semispherical cavity and a pimple wherein a part of the pimple also serves as a retractable hold pin. The hold pin was protruded to hold the core. The intermediate layer composition was heated to 200° C. to 260° C. at the cylinder portion of the injection device, injected into the mold held under a pressure of 15 MPa, and cooled for 30 seconds. Then, the mold was opened, and the spherical body having the intermediate layer formed thereon was ejected from the mold.

When molding the cover, the hold pin was protruded to hold the spherical body having the intermediate layer formed thereon, and the resin heated to 260° C. was charged into the mold held under a pressure of 80 tons for 0.3 second, and cooled for 30 seconds. Then, the mold was opened, and the golf ball was ejected from the mold. The surface of the obtained golf ball body was treated with sandblast, marked, and painted with a clear paint. The paint was dried in an oven at 40° C. to obtain the golf ball having a diameter of 42.7 mm and a mass of 45.4 g. Evaluation results regarding the compression deformation amount, resilience, flight distance and shot feeling of the obtained golf ball are shown in tables 2 to 4.

It can be seen from Tables 2 to 4 that the golf ball resin composition according to the present invention is excellent in rebound resilience. Further, the golf ball using the golf ball resin composition according to the present invention is excellent in resilience and shot feeling. The golf ball resin composition according to the present invention comprises: (A) at least one resin component selected from the group consisting of (a-1) a binary copolymer composed of an olefin and an $\alpha,\beta$-unsaturated carboxylic acid having 3 to 8 carbon atoms, (a-2) an ionomer resin consisting of a metal ion-neutralized product of a binary copolymer composed of an olefin and an $\alpha,\beta$-unsaturated carboxylic acid having 3 to 8 carbon atoms, (a-3) a ternary copolymer composed of an olefin, an $\beta,\beta$-unsaturated carboxylic acid having 3 to 8 carbon atoms and an $\alpha,\beta$-unsaturated carboxylic acid ester, and (a-4) an ionomer resin consisting of a metal ion-neutralized product of a ternary copolymer composed of an olefin, an $\alpha,\beta$-unsaturated carboxylic acid having 3 to 8 carbon atoms and an $\alpha,\beta$-unsaturated carboxylic acid ester, (B) a saturated fatty acid, and (C) an unsaturated fatty acid; wherein a total content of (B) the saturated fatty acid and (C) the unsaturated fatty acid ranges from 100 parts by mass to 200 parts by mass with respect to 100 parts by mass of (A) the resin component.

The golf ball resin composition according to the present invention is suitably used for a constituent member of a golf ball, and is particularly useful for an intermediate layer of a golf ball. This application is based on Japanese Patent Application No. 2014-266653 filed on Dec. 26, 2014, the contents of which are hereby incorporated by reference.

The invention claimed is:

1. A golf ball resin composition consisting of:
   (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester,
   (B) a saturated fatty acid,
   (C) an unsaturated fatty acid,
   (D) an amphoteric surfactant,
   (E) a metal compound, and
   optionally a component selected from the group consisting of a pigment component, a weight adjusting agent, a dispersant, an antioxidant, an ultraviolet absorber, a light stabilizer, a fluorescent material and a fluorescent brightener,
   wherein the resin composition total degree of neutralization of acid groups is more than 90 mole %, a total content of (B) the saturated fatty acid and (C) the unsaturated fatty acid ranges from 100 parts by mass to 200 parts by mass with respect to 100 parts by mass of (A) the resin component, and a mass ratio (B)/(C) of (B) the saturated fatty acid to (C) the unsaturated fatty acid ranges from 20/80 to 60/40.

2. The golf ball resin composition according to claim 1, wherein (B) the saturated fatty acid is a linear saturated fatty acid having 16 to 30 carbon atoms.

3. The golf ball resin composition according to claim 1, wherein (B) the saturated fatty acid includes at least one selected from the group consisting of palmitic acid, stearic acid, arachidic acid, behenic acid, lignoceric acid, and montanic acid.

4. The golf ball resin composition according to claim 1, wherein (C) the unsaturated fatty acid is a linear unsaturated fatty acid having 12 to 30 carbon atoms.

5. The golf ball resin composition according to claim 1, wherein (C) the unsaturated fatty acid includes at least one selected from the group consisting of palmitoleic acid, oleic acid, linoleic acid, and arachidonic acid.

6. The golf ball resin composition according to claim 1, wherein (D) the amphoteric surfactant includes at least one selected from the group consisting of a betaine type amphoteric surfactant, an amidoamino acid type amphoteric surfactant, an alkylamino fatty acid salt type amphoteric surfactant, an alkylamine oxide type amphoteric surfactant, a β-alanine type amphoteric surfactant, a glycine type amphoteric surfactant, a sulfobetaine type amphoteric surfactant, and a phosphobetaine type amphoteric surfactant.

7. The golf ball resin composition according to claim 1, wherein a content of (D) the amphoteric surfactant ranges from 1 part by mass to 20 parts by mass with respect to 100 parts by mass of (A) the resin component.

8. The golf ball resin composition according to claim 1, wherein the golf ball resin composition has a slab hardness ranging from 20 to 80 in Shore D hardness.

9. The golf ball resin composition according to claim 1, wherein a total degree of neutralization of acid groups in the resin composition is more than 100 mole %.

10. A golf ball comprising a constituent member formed from a golf ball resin composition, wherein the golf ball resin composition consists of:
    (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester,
    (B) a saturated fatty acid,
    (C) an unsaturated fatty acid,
    (D) an amphoteric surfactant,
    (E) a metal compound, and
    optionally a component selected from the group consisting of a pigment component, a weight adjusting agent, a dispersant, an antioxidant, an ultraviolet absorber, a light stabilizer, a fluorescent material and a fluorescent brightener,
    wherein the resin composition total degree of neutralization of acid groups is more than 90 mole %, a total content of (B) the saturated fatty acid and (C) the unsaturated fatty acid ranges from 100 parts by mass to 200 parts by mass with respect to 100 parts by mass of (A) the resin component, and a mass ratio (B)/(C) of (B) the saturated fatty acid to (C) the unsaturated fatty acid ranges from 20/80 to 60/40.

11. The golf ball according to claim 10, wherein (B) the saturated fatty acid is a linear saturated fatty acid having 16 to 30 carbon atoms.

12. The golf ball according to claim 10, wherein (B) the saturated fatty acid includes at least one selected from the group consisting of palmitic acid, stearic acid, arachidic acid, behenic acid, lignoceric acid, and montanic acid.

13. The golf ball according to claim 10, wherein (C) the unsaturated fatty acid is a linear unsaturated fatty acid having 12 to 30 carbon atoms.

14. The golf ball according to claim 10, wherein (C) the unsaturated fatty acid includes at least one selected from the group consisting of palmitoleic acid, oleic acid, linoleic acid, and arachidonic acid.

15. The golf ball according to claim 10, wherein (D) the amphoteric surfactant includes at least one selected from the group consisting of a betaine type amphoteric surfactant, an amidoamino acid type amphoteric surfactant, an alkylamino fatty acid salt type amphoteric surfactant, an alkylamine oxide type amphoteric surfactant, a β-alanine type amphoteric surfactant, a glycine type amphoteric surfactant, a sulfobetaine type amphoteric surfactant, and a phosphobetaine type amphoteric surfactant.

16. The golf ball according to claim 10, wherein a content of (D) the amphoteric surfactant ranges from 1 part by mass to 20 parts by mass with respect to 100 parts by mass of (A) the resin component.

17. The golf ball according to claim 10, wherein the golf ball resin composition has a slab hardness ranging from 20 to 80 in Shore D hardness.

18. The golf ball according to claim 10, wherein a total degree of neutralization of acid groups in the resin composition is more than 100 mole %.

* * * * *